United States Patent [19]

Wills et al.

[11] Patent Number: 4,790,504

[45] Date of Patent: Dec. 13, 1988

[54] DISPLAY SUPPORT MECHANISM

[75] Inventors: David C. Wills; Jay D. Atkinson, both of Cambridge, Ohio

[73] Assignee: NCR Corporation, Dayton, Ohio

[21] Appl. No.: 136,068

[22] Filed: Dec. 21, 1987

[51] Int. Cl.⁴ .............................................. F16M 13/00
[52] U.S. Cl. ................................ 248/183; 248/221.3; 248/278; 248/291; 248/371; 248/1 I
[58] Field of Search ............... 248/178, 278, 1 C, 1 E, 248/1 F, 1 J, 1 I, 285, 291, 371, 221.3, 221.4, 183; 16/266, DIG. 13, 385

[56] References Cited

U.S. PATENT DOCUMENTS

| | | | |
|---|---|---|---|
| 2,011,675 | 8/1935 | Cawood | 16/266 X |
| 2,188,150 | 1/1940 | Malat | 248/185 X |
| 2,254,796 | 9/1941 | Benton | 248/291 X |
| 3,531,823 | 10/1970 | Cornelius | 16/385 X |
| 4,589,713 | 5/1986 | Pfuhl et al. | 339/7 |
| 4,645,153 | 2/1987 | Granzow et al. | 248/178 |
| 4,666,068 | 5/1987 | Bush | 16/DIG. 13 X |
| 4,696,412 | 9/1987 | McGowan et al. | 16/DIG. 13 |
| 4,701,977 | 10/1987 | Hori et al. | 16/266 |
| 4,731,903 | 3/1988 | Kennedy et al. | 16/DIG. 13 X |

FOREIGN PATENT DOCUMENTS 22963 of 1906 United Kingdom .................. 16/266

Primary Examiner—Alvin C. Chin-Shue
Attorney, Agent, or Firm—Wilbert Hawk, Jr.; Albert L. Sessler, Jr.; Richard W. Lavin

[57] ABSTRACT

A quick release tilt and swivel apparatus supports a structure such as an alphanumeric plasma display associated with a electronic cash register. The apparatus includes a pair of spaced-apart lug members mounted on a pair of fingers extending outwardly from a base member which are inserted within a socket portion of the display for enabling the display to be tilted and swiveled about the cash register. The display includes a flexible wall portion for enabling the display to be quickly mounted and released from the base member. The display and the lug members are molded of a plastic material and are dimensioned to allow the lug member to deform the socket portion of the display for holding the display in any number of settable positions.

10 Claims, 5 Drawing Sheets

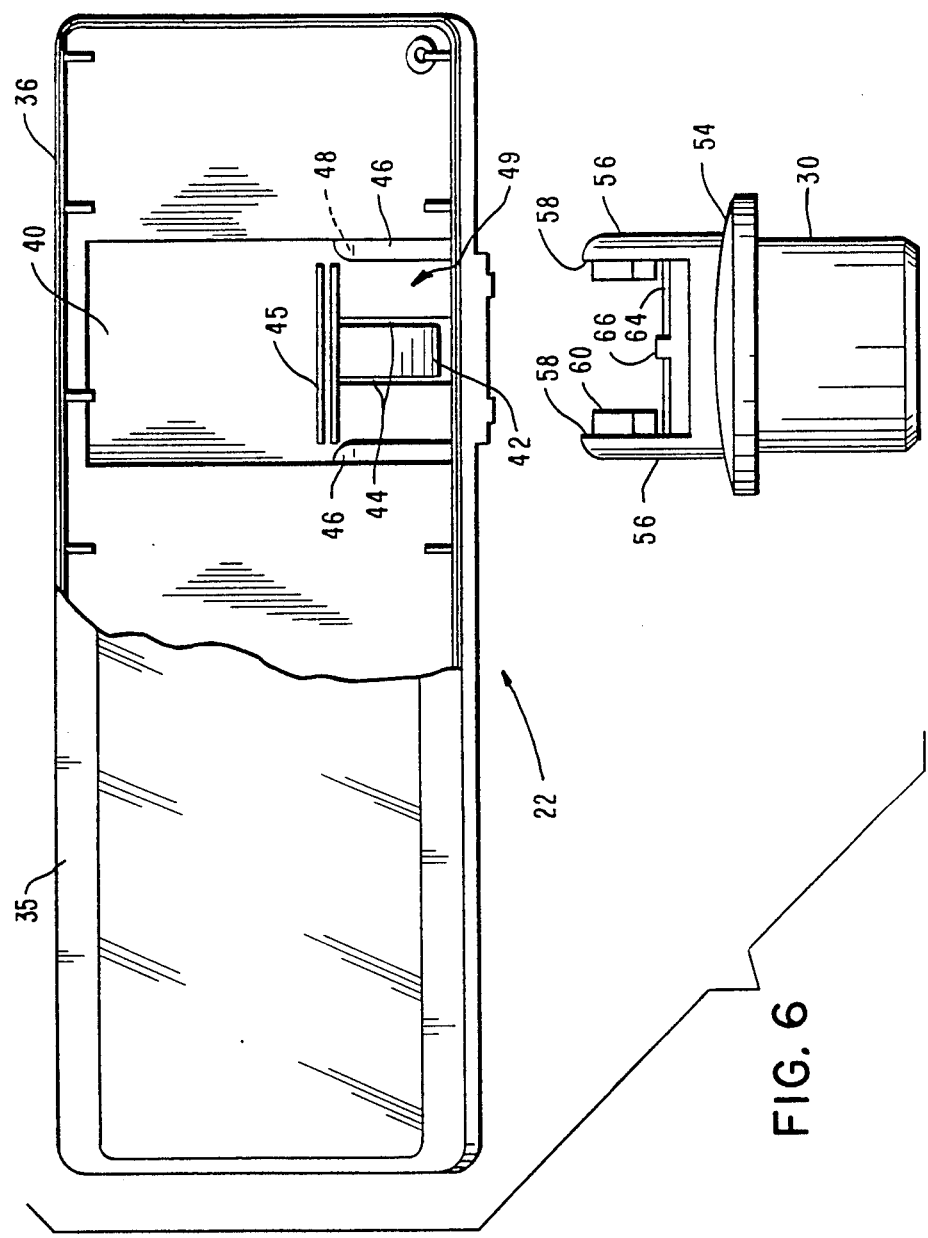

DISPLAY SUPPORT MECHANISM

BACKGROUND OF THE INVENTION

The present invention relates generally to support mechanisms, and more particularly to an apparatus for tilting and rotating a display member which is constructed for easy removal of the display member from such apparatus.

In the past, display members associated with business terminals such as electronic cash registers were normally constructed as part of the cabinetry of the register. With modern electronic cash registers being constructed in modular form, the display member has been mounted at various locations on the cash register or at a location remote from the cash register depending on the environment in which the cash register is used. Normally, the factors governing the location of the display member with respect to the cash register is the viewing angle of the customer and the cash register operator. To accommodate different heights of the cash register operator and to compensate for the glare generated from room light or sun on the display, it is further desirable to have the display member mounted in such a manner that the angle of the face of the display member is easily adjustable by the operator of the terminal.

SUMMARY OF THE INVENTION

In accordance with one embodiment of the invention, an apparatus for supporting a display member molded of a plastic material comprises a support member having a circular base portion and two spaced-apart finger portions extending outwardly therefrom, each of which has molded on its inside surfaces facing lug portions which are moved through a slot in the display member to a rotatable position within a pivot opening extending along a rear wall extension of the display member. The lug portions take the form of ribbed box portions having a diameter which provides an interference fit with the pivot opening in the display member causing the pivot opening to be deformed upon rotation of the display member on the support member enabling the display member to be rotated and held in any number of display positions. A part of the rear wall extension of the display member comprises a flexible wall portion which engages a tab portion of the support member for limiting the rotation of the display member and for locking the display member in a predetermined position. Depressing the flexible wall portion releases the display member from engagement with the tab portion enabling the display member to be rotated to a position in which the slot in the pivot opening in the display member is aligned with the ribbed box portions of the support member allowing the display member to be removed from engagement with the support member.

It is therefore a principal object of this invention to provide a support structure for a display member in which the display member can be moved to a plurality of viewing positions.

It is another object of this invention to provide a support structure for a display member which allows the display member to be easily removed from and mounted to the support structure.

It is a further object of this invention to provide a support structure for a display member which is simple in construction and therefore low in cost.

With these and other objects, which will become apparent from the following description, the invention includes certain novel features of construction and combinations of parts, a preferred form or embodiment of which is described with reference to the drawings which accompany and form a part of this specification.

BRIEF DESCRIPTION OF THE DRAWINGS

FIG. 6 is an exploded front view of the display assembly with a portion of the display panel member removed.

DETAILED DESCRIPTION OF THE PREFERRED EMBODIMENT

Figure 1:
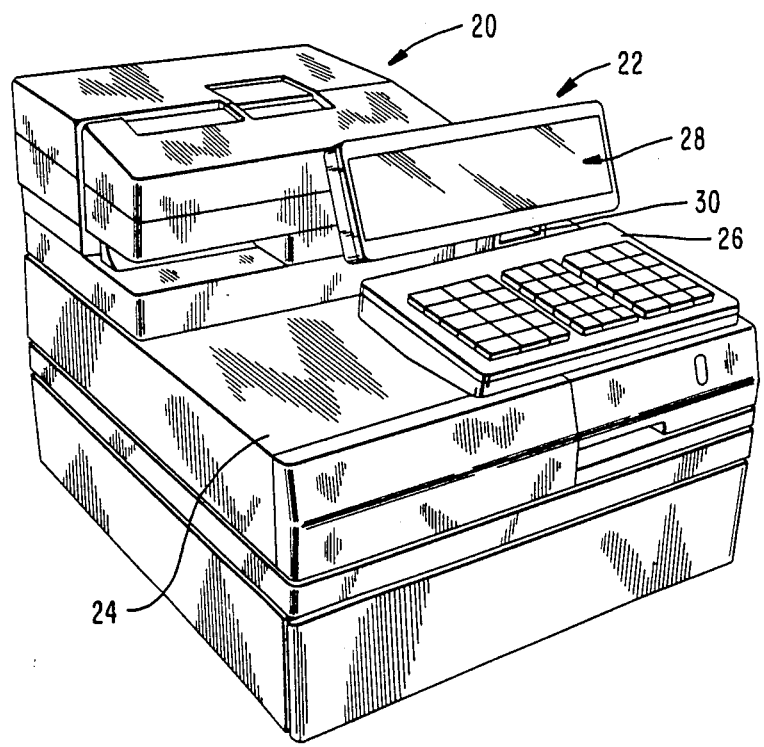
FIG. 1 is a perspective view of a cash register showing the location of the display member of the present invention.

Referring now to FIG. 1, there is shown a perspective view of an electronic cash register or terminal device generally indicated by the numeral 20 which includes a display assembly 22 mounted to the rear edge of a keyboard member 26 positioned on a front portion 24 of the cash register 20. The display assembly 22 includes a display panel member 28 and a support member 30 which in turn is mounted to the front portion 24 of the cash register 20.

Figure 2:
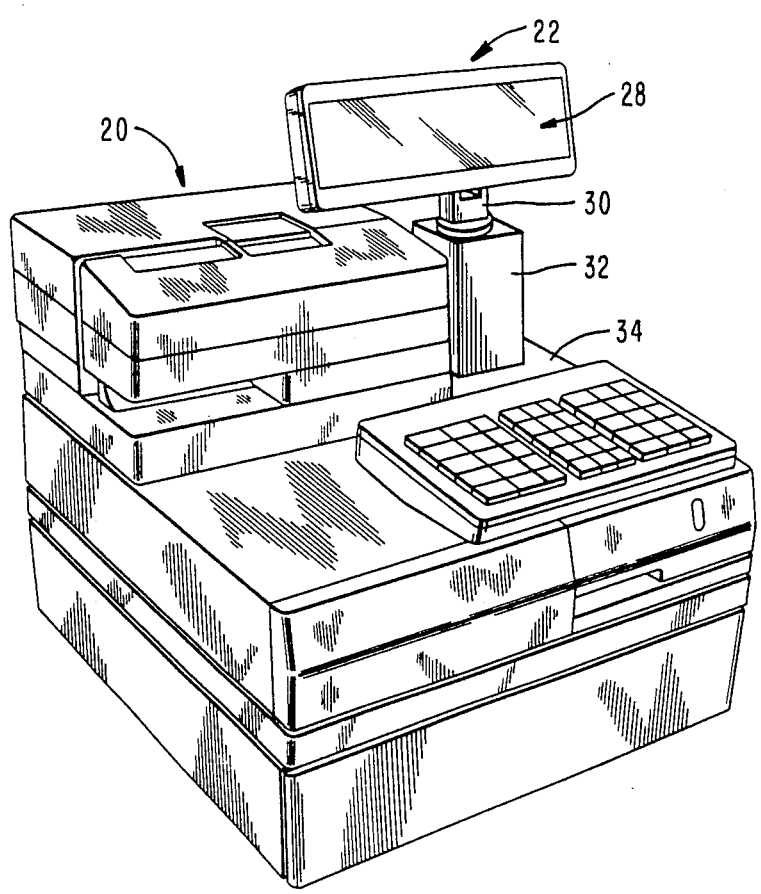
FIG. 2 is a perspective view of the cash register shown in FIG. 1 with the display member mounted in a second location on the cash register.

Referring now to FIG. 2, there is shown a perspective view of the cash register 20 with the display assembly 22 mounted on a post support member 32 secured to a rear portion 34 of the cash register 20. As previously described, the controlling factor used in positioning the display panel member 28 on the cash register is the location of the cash register with respect to the viewing angle of the customer associated with the cash register operation. The mounting of the display panel member 28, as shown in FIG. 2, provides a much larger viewing field for the customer than that of FIG. 1. The advantage of the present invention allows the display panel member 28 to be quickly removed from the support member 30 shown in FIG. 1 and mounted on a second support member 30 which is rotatably mounted to the post member 32 shown in FIG. 2.

Figure 3:
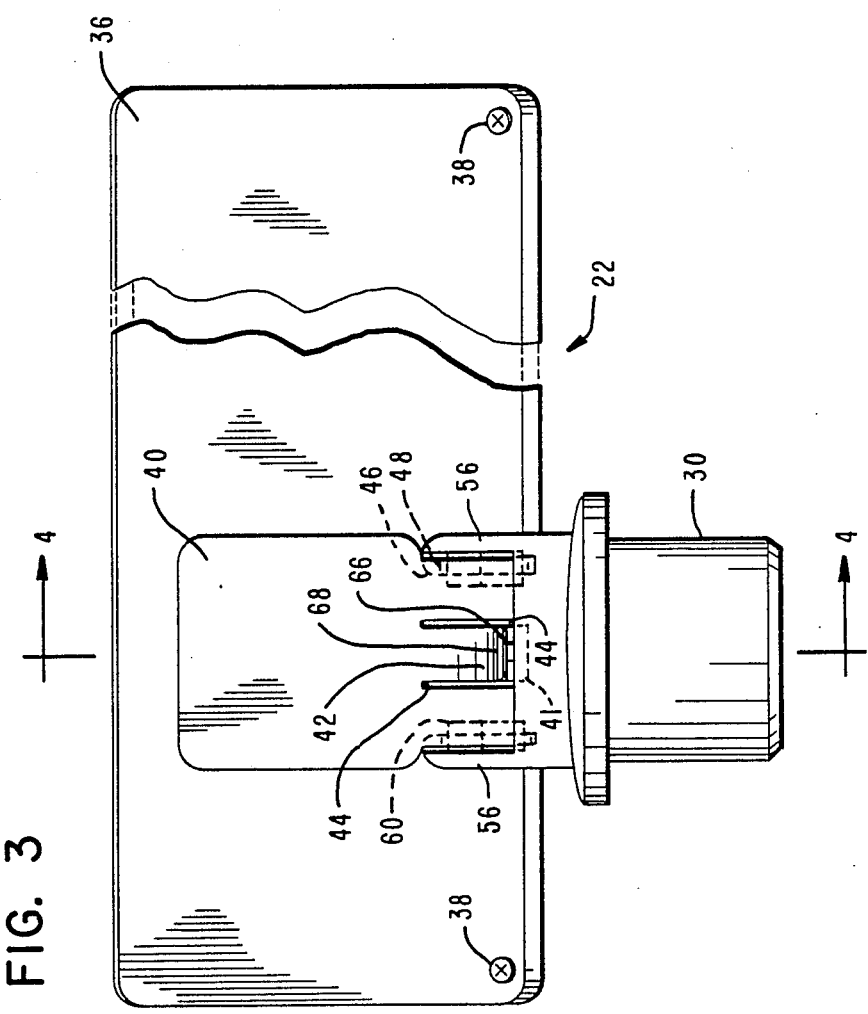
FIG. 3 is a rear view of the display assembly of the present invention.

Referring now to FIGS. 3-6 inclusive, there are shown details of the construction of the display assembly 22. The assembly 22 (FIG. 3) includes the display panel member 28 comprising a plasma or other type of display member 35 and a rear cover member 36 which is secured to the display member by screws 38 (FIG. 3). The display panel member 28 and the support member 30 are molded of a thermal plastic material such as GE Noryl PC 180 which is commercially available from the General Electric Corporation of Schenectady, N.Y. The rear cover member 36 includes a rear wall extension portion 40 which includes a flexible wall portion 42 formed by parallel slots 44 located in the lower rear edge 41 of the extension portion 40. As best seen in FIG. 6, the rear wall extension portion 40 includes a shelf portion 45 extending along the inside surface of the rear wall extension portion 40 in a horizontal direction for internally mounting a safety barrier member (not shown) and a pair of oppositely located ribbed edge portions 46 located on the inside surfaces of the wall portion 40 in each of which is located an aperture 48 (FIG. 5) forming the entrance to a socket or pivot opening 49 within the wall portion 40.

Figure 5:
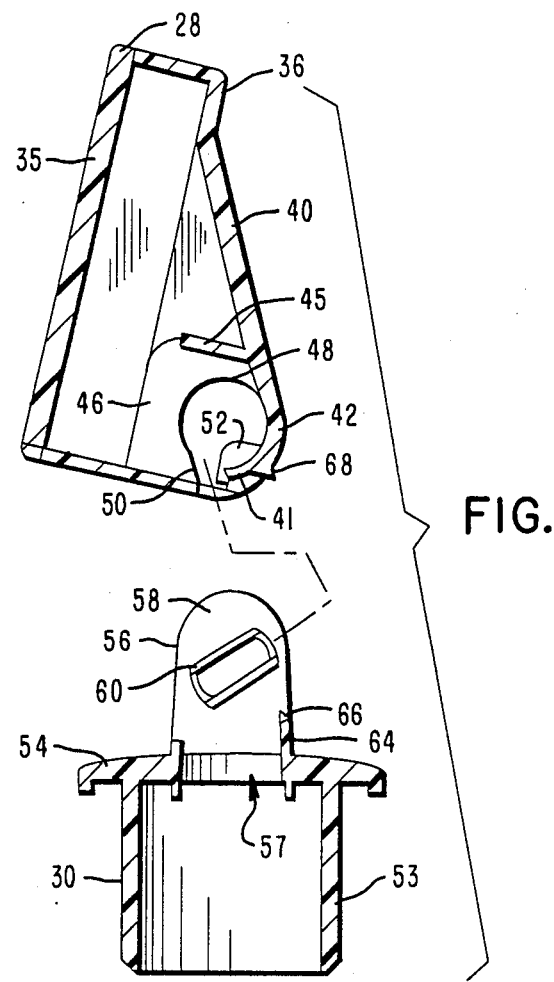
FIG. 5 is an exploded view of the display assembly of FIG. 4 showing the mounting of the display member on the support member.

As best seen in FIG. 5, located in the bottom edge of each of the edge portions 46 in the rear extension portion 40 is a slot 50 communicating with an associated aperture 48 and a cam surface 52 extending into the aperture 48. As will be described more fully hereinafter, the surface 52 coacts with a portion of the support member 30 to limit the rotation of the display panel member 28 within the apertures 48.

The support member 30 comprises a hollow cylindrical base member 53 having a ridge portion 54 from which projects two spaced-apart finger portions 56 and an aperture 57 located in the center of the ridge portion 54 through which electrical conductors (not shown) from the display member are positioned. Molded on the inside faces 58 of the finger portions 56 are a pair of lugs comprising ribbed box sections 60. Located along a rear edge portion 64 (FIGS. 5 and 6) of the base member 53 is a tab portion 66 which coacts with a raised notch edge portion 68 in the rear edge 41 of the flexible wall portion 42 (FIG. 5) to lock and to limit the rotation of the display panel member 28 within the support member 30 in a manner that will now be described.

Figure 4:
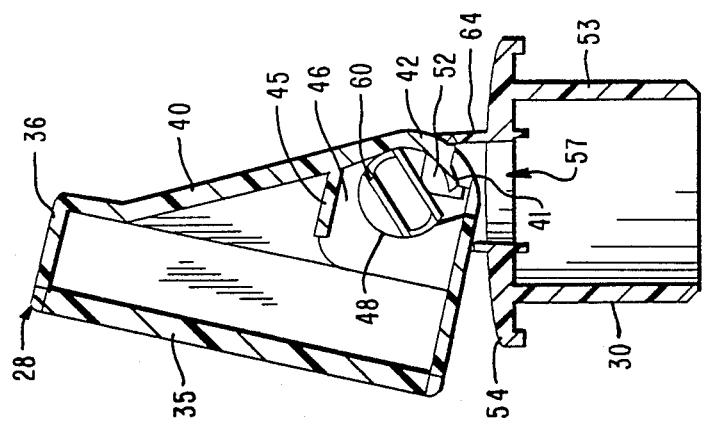
FIG. 4 is a sectional view taken along line 4—4 of FIG. 3.

In mounting the display panel member 28 to the support member 30, the panel member 28 is rotated to a position aligning the slots 50 with the narrow dimension of the ribbed box sections 60 of the support member 30, as shown by the phantom lines in FIG. 5, allowing the box sections to be inserted within the apertures 48 through the slots 50 (FIG. 4). Once the box sections are positoned within the apertures 48, counterclockwise rotation of the panel member 28 as viewed in FIGS. 4 and 5 will position the notched edge portion 68 of the wall portion 42 into engagement with the tab portion 66 of the base member 53. Further counterclockwise rotation of the panel member 28 forces the flexible wall portion 42 inwardly to a position where the panel portion will snap back and over the tab portion 66, preventing the panel member 28 from moving in a clockwise direction as viewed in FIGS. 4 and 5. The counterclockwise movement of the panel member 28 is limited by the cam surface 52 (FIG. 4) engaging and depressing a rib edge of the box sections 60.

The lengthwise dimension of the ribbed box sections 60 (FIGS. 4 and 5) of the present invention is constructed to be 0.020 inches greater than the diameter of the aperture 48 thus providing an interference fit when the ribbed sections 60 are positioned within the apertures 48. This arrangement allows the panel member 28 to be held in any number of display positions by the friction generated between the box sections 60 and the edge of the aperatures 48. The rotation of the ribbed box sections 60 within the apertures 48 deforms the apertures. This deformation is the key to maintaining the display position of the panel member 28. The plastic construction of the display panel member 28 creeps with time to relax hoop stresses created in the apertures 48 by the interference between the ribbed box sections 60 and the apertues 48. If the display panel member 28 is set in one position long enough to allow the hoop stresses to relax and friction torque to decrease, the display panel member will be held in the set position by the deformed shape of the apertures 48. If the display panel member is then rotated to a new position, the deformed shape of the apertures 48 rotates to the new position and hoop stresses and friction torque are then restored. It is this arrangement which allows the pivot operation of the display to be totally integrated into the panel material. The length of rotation of the panel member 28 and the amount of force necessary to rotate the member 28 are controlled by the interference fit between the box sections 60 and the apertures 48.

When the display panel member 28 is required to be removed from the base member 30, depressing the wall portion 42 allows the notch edge portion 68 to miss engaging the tab portion 66 during a clockwise rotation of the panel member 28 thereby allowing the display panel member 28 to be rotated to a position where the box sections 60 are aligned with the slots 50, allowing the member 28 to be removed from engagement with the support member 30.

It will be seen from the display assembly disclosed that there is provided a pivot arrangement with the support member which allows the angle of the face of the display assembly to be adjusted by the operator. The design of the pivot structure is such that the pivot structure is comprised of features molded into the display panel member and the support member and that no additional parts are required to achieve the pivot function. This construction allows the panel member and the support member to snap together with no screws or fasteners being required, thereby reducing assembly cost, and provides user serviceability for removing the display panel member to a different location on the cash register.

While the features of the invention have been illustrated and described, it should readily be apparent to those skilled in the art that many changes and modifications can be made in the apparatus of the invention recited without departing from the spirit and scope of the invention. Accordingly, the present invention should be considered as encompassing all such changes and modifications of the invention that fall within the broad scope of the invention as defined by the appended claims.

We claim:

1. The combination comprising;
   a base member having a pair of opposed spaced-apart finger portions extending upwardly therefrom;
   oppositely positioned engaging means mounted on the inside surfaces of said finger portions;
   a structure mounted on said base member for limited tilt and swivel movement, said structure including socket means having a pair of opposed apertures and a rear flexible wall portion having an end portion including a raised engaging portion, said socket means further including slotted portions for receiving the engaging means of said base member enabling the engaging means to be mounted within the socket means allowing the structure to be rotated about said engaging means; and
   said base member including an edge portion engaging the end portion of the rear wall portion whereby upon the rotation of the structure about the engaging means to a predetermined position, said edge portion engages the raised engaging portion thereby deflecting the rear wall portion to move to a position engaging the raised engaging portion for holding the structure at said predetermined position.

2. The combination of claim 1 in which the socket means includes a cam surface engaging the engaging meaans of the base member upon the positioning of the engaging means within said socket means for limiting the rotational movement of said structure about said engaging means.

3. The combination of claim 2 in which said socket means comprises a pair of spaced-apart circular ribbed portions of the structure extending outwardly from the rear of the structure and includes said apertures one of which is located in each of said ribbed portions for receiving the engaging means of said base member, said slotted portions extending from each of said apertures through said structure enabling the engaging means to be moved through the slotted portions to a position within said apertures enabling the structure to be rotatably mounted on said engaging means.

4. The combination of claim 3, in which said rear flexible wall portion has a pair of vertically extending spaced-apart slots for forming said flexible wall portion which includes said raised portion whereby upon rotation of the structure in a first direction to said predetermined position, said edge portion engages said raised portion thereby deflecting the flexible wall portion to engage the downstream edge of the raised portion to limit the rotational movement of said structure in a direction opposite to said first direction, said flexible wall portion being depressable to release the raised portion from engagement with said edge portion thereby enabling the structure to be rotated to a position from where the engaging means are retracted from the socket means thereby enabling the structure to be removed from the base member.

5. The combination of claim 4, in which the base member and the structure are molded of a plastic material and said engaging means has a diameter slightly larger than the apertures in said socket means whereby rotation of the structure about the engaging means to said predetermined position enables the engaging means to deform the mating edge of the apertures holding the structure in said predetermined position.

6. A disengageable tilt and swivel apparatus mounted on a support member comprising;
  a circular base member rotatably mounted on said support member and having a pair of upwardly extending spaced-apart finger portions;
  oppositely facing lug members protuding from the inside surfaces of the finger portions;
  an enclosure including a wall member having an outwardly extended wall portion including a flexible wall portion having a raised engaging portion and a pair of socket openings extending along the extended wall portion;
  a pair of slots extending from the outside of the enclosure to the pair of socket openings for receiving the lug members of the base member enabling the enclosure to be rotatably mounted on said lug members; and
  said base member including an edge portion engaging the flexible wall portion whereby upon the rotation of the enclosure around the lug members to a predetermined position, said edge portion engages the raised engaging portion deflecting the flexible wall portion to position the edge portion downstream against the raised engaging portion to lock the enclosure in said predetermined position, said flexible wall portion being depressable to release the edge portion from engaging the raised engaging portion allowing the enclosure to be moved to a position enabling the lug members to be retracted from the socket openings through the slots during the removal of the enclosure from the base member.

7. The apparatus of claim 6, in which the enclosure includes a cam surface extending into the socket openings for engaging the lug members upon the positioning of the lug members within the socket opening for limiting the rotational movement of the lug members within the socket openings.

8. The apparatus of claim 7, in which the socket openings comprise a pair of spaced-apart ribbed portions extending perpendicular to said wall portion in each of which is located an aperture forming the socket openings for receiving the lug members of the base member, said slots communicating with said apertures enabling the lug members to be moved through the slots to a position within the apertures enabling the structure to be rotatably mounted on said lug members in said socket opening.

9. The apparatus of claim 8, in which the base member is molded of a plastic material and said lug members comprise molded ribbed box portions formed on the inside surfaces of the finger portions whose narrow dimension is less than the width of the slots thereby allowing the ribbed box portions to be moved through the slots to a position within the apertures.

10. The apparatus of claim 9, in which the enclosure is molded of a plastic material and the largest dimension of said ribbed box portions is slightly greater than the diameter of the apertures in the sockets openings whereby rotation of the enclosure about the box portions to said predetermined position allows the box portion to deform the edges of the apertures thereby holding the enclosure in said predetermined position.

* * * * *

UNITED STATES PATENT AND TRADEMARK OFFICE
CERTIFICATE OF CORRECTION

PATENT NO. : 4,790,504

DATED : December 13, 1988

INVENTOR(S) : David C. Wills et al.

It is certified that error appears in the above-identified patent and that said Letters Patent is hereby corrected as shown below:

Column 5, line 3, delete "meaans" and substitute --means--.

Signed and Sealed this

Twenty-third Day of May, 1989

Attest:

*Attesting Officer*

DONALD J. QUIGG

*Commissioner of Patents and Trademarks*